W. BROWN.
Pulley.

No. 216,079. Patented June 3, 1879.

Witnesses:
Fred G. Dieterich
Jno. P. Brooks

Inventor
William Brown
by Louis Bagger & Co.
his attorneys

UNITED STATES PATENT OFFICE.

WILLIAM BROWN, OF SMITHVILLE, NEW JERSEY.

IMPROVEMENT IN PULLEYS.

Specification forming part of Letters Patent No. 216,079, dated June 3, 1879; application filed June 18, 1878.

*To all whom it may concern:*

Be it known that I, WILLIAM BROWN, of Smithville, in the county of Burlington and State of New Jersey, have invented certain new and useful Improvements in Pulleys; and I do hereby declare that the following is a full, clear, and exact description of the invention, which will enable others skilled in the art to which it appertains to make and use the same, reference being had to the accompanying drawings, which form a part of this specification, and in which—

Figure 1:
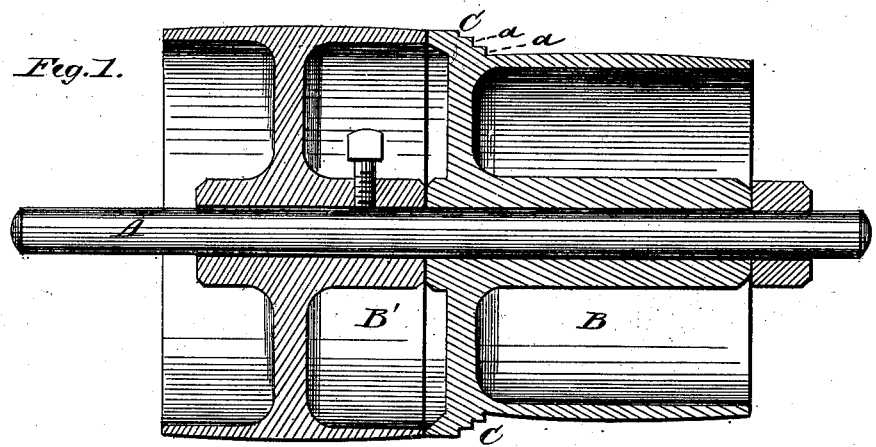
Figure 2:
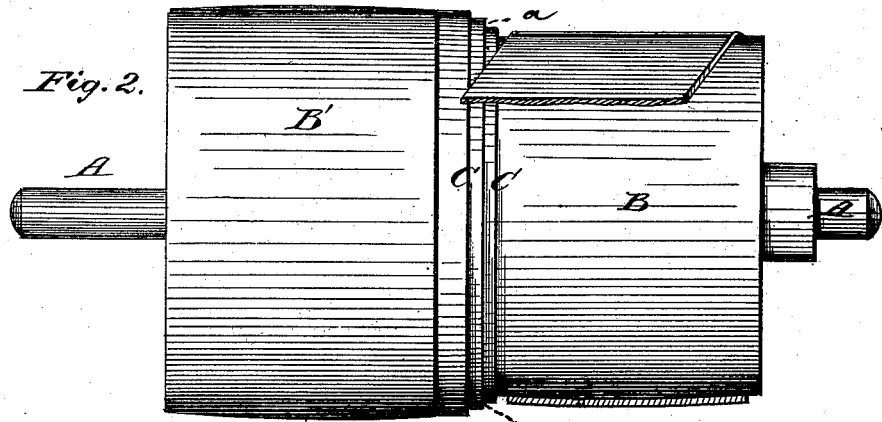
Figure 3:
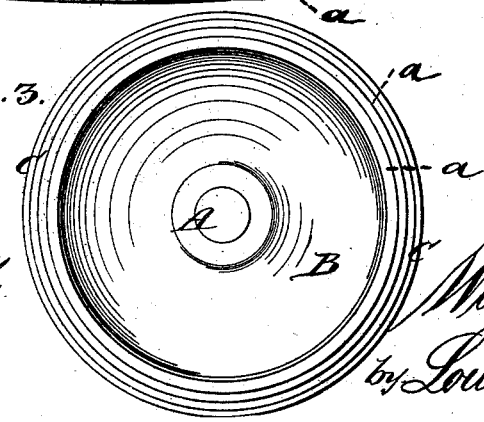

Figure 1 is a longitudinal vertical section of my improved pulley. Fig. 2 is a side elevation of the same, and Fig. 3 is an end view thereof.

Corresponding parts in the several figures are denoted by like letters.

This invention relates to that class of devices which are employed in connection or combination with a fixed and a loose pulley, when these are of different diameter, for the purpose of facilitating the shifting of the belt from the smaller to the larger pulley; and it consists in the combination, with such pulleys, mounted upon a common shaft and adjacent to each other, of an intermediate series of annular concentric steps, forming a series of two or more annular flanges or shoulders, set back of each other, and having straight or vertical faces, or faces at a right angle to the center line of the axle, substantially as and for the purpose to be hereinafter more fully described.

The object of my said improvement is to reduce the friction and wear in shifting the belt from the smaller to the larger pulley.

Upon the shaft A, in the drawings, are arranged two pulleys, a loose one, B, and a fixed or tight pulley, B', whose diameter exceeds that of the loose pulley. The loose pulley is provided at that end next to the tight pulley with a cone of two or more annular steps, C C, having straight faces $a\ a$, the periphery of the uppermost one of which steps is in the same plane with the face or periphery of the tight pulley to permit of the belt being slipped or slid thereon. The cone of steps C C may be made entirely separate or independent of either pulley without departing from the spirit of my invention.

It will be observed that upon shipping the belt from the loose pulley onto the tight or large pulley, it (the belt) will, as it is inclined upwardly by the shipper, be lifted by each of the cone of steps C until it has reached the face or periphery of the uppermost one, and be slid therefrom to and upon the fast pulley, and thus expeditiously accomplish the shipping of the belt without its sustaining any injury or concussion.

It will be observed that, owing to the slight surface of contact between the belt and steps as it is lifted up over the same, little or no appreciable wear is sustained by or resistance offered to the belt, and the shipping thereof thus expedited and rendered easy.

Having thus fully described my invention, I claim and desire to secure by Letters Patent of the United States—

In combination with a fixed and a loose pulley of different diameter and situated upon the same shaft adjacent to each other, an intermediate series of annular concentric steps, C C, having straight or vertical faces $a$, set back of each other, and extending from the periphery of the smaller pulley to the adjacent periphery of the larger, substantially as and for the purpose herein shown and specified.

In testimony that I claim the foregoing as my own I have hereto affixed my signature in presence of two witnesses.

WILLIAM BROWN.

Witnesses:
 LOUIS BAGGER,
 AUGUST PETERSOHN.